United States Patent
Widmer et al.

(10) Patent No.: US 10,559,402 B1
(45) Date of Patent: Feb. 11, 2020

(54) TWIST RESISTANT ELECTRICAL HARNESS

(71) Applicant: GOODRICH CORPORATION, Charlotte, NC (US)

(72) Inventors: Jonathan L. Widmer, Jud, ND (US); Wallace Harold Larson, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/525,398

(22) Filed: Jul. 29, 2019

(51) Int. Cl.
H01B 7/22 (2006.01)
H01B 7/18 (2006.01)
H02G 11/00 (2006.01)

(52) U.S. Cl.
CPC ........... *H01B 7/188* (2013.01); *H01B 7/1865* (2013.01); *H01B 7/228* (2013.01); *H02G 11/00* (2013.01)

(58) Field of Classification Search
CPC ...... H01B 7/188; H01B 7/228; H01B 7/1865; H02G 11/00
USPC ........................... 174/72 A, 120 R
See application file for complete search history.

(56) References Cited

U.S. PATENT DOCUMENTS

| 4,675,475 | A | * | 6/1987 | Bortner | D04C 1/06 156/172 |
| 4,822,950 | A | * | 4/1989 | Schmitt | H01B 11/1813 174/109 |
| 5,103,067 | A | * | 4/1992 | Aldissi | H01B 11/1033 174/107 |
| 5,195,393 | A | | 3/1993 | Wolfington et al. | |
| 5,475,185 | A | * | 12/1995 | Tokarsky | H01B 11/1813 174/107 |
| 6,350,956 | B1 | * | 2/2002 | Sakata | B60R 16/0215 16/221 |
| 8,450,610 | B2 | | 5/2013 | Alvelo et al. | |
| 2004/0200635 | A1 | | 10/2004 | Menze et al. | |
| 2005/0150679 | A1 | * | 7/2005 | Grogl | H01B 3/28 174/120 R |
| 2012/0103651 | A1 | * | 5/2012 | Kim | H01B 11/1808 174/102 R |

* cited by examiner

Primary Examiner — Sherman Ng
(74) Attorney, Agent, or Firm — Snell & Wilmer, L.L.P.

(57) ABSTRACT

An electrical harness includes an electrical cable, an inner tubing, an outer tubing, and a braid tubing disposed between the inner tubing and the outer tubing. The braid tubing is physically contacting the inner tubing and the outer tubing to react against twisting of the electrical harness.

18 Claims, 2 Drawing Sheets

TWIST RESISTANT ELECTRICAL HARNESS

FIELD

The present disclosure relates generally to electrical harnesses and, more particularly, to electrical harnesses for routing electric power and/or data between moving parts, or to an electrical harness moving within a single plane of confined space.

BACKGROUND

Power cables may move and/or be routed between moving parts, often within a confined space, to provide electric power to various components. The power cable may be susceptible to twisting in response to a first member moving with respect to a second member to which the power cable is coupled at either end. This twisting may cause the power cable to bend and come into contact with adjacent parts.

SUMMARY

An electrical harness is disclosed, comprising an electrical cable, an inner tubing extending from a first end of the electrical harness to a second end of the electrical harness, the inner tubing encasing the electrical cable, a braid tubing extending from the first end of the electrical harness to the second end of the electrical harness, the braid tubing encasing the inner tubing, and an outer tubing extending from the first end of the electrical harness to the second end of the electrical harness, the outer tubing encasing the braid tubing, wherein the braid tubing physically contacts the inner tubing and the outer tubing.

In various embodiments, the braid tubing comprises a plurality of wires tightly braided together to form a generally cylindrical tubing.

In various embodiments, the braid tubing is mechanically locked with the inner tubing and the outer tubing.

In various embodiments, the inner tubing encases a plurality of electrical wires.

In various embodiments, the inner tubing comprises a polymer material.

In various embodiments, the outer tubing comprises a polymer material.

In various embodiments, the electrical harness further comprises a first electrical plug positioned at the first end of the electrical harness and a second electrical plug positioned at the second end of the electrical harness.

In various embodiments, the first electrical plug is disposed about the outer tubing.

In various embodiments, an outer diameter of the braid tubing is substantially equal to an inner diameter of the outer tubing.

In various embodiments, an inner diameter of the braid tubing is substantially equal to an outer diameter of the inner tubing.

A harness system is disclosed, comprising a first component, a second component configured to move with respect to the first component, and an electrical harness. The electrical harness comprises an electrical cable having a first end and a second end, an inner tubing extending from the first end of the electrical harness to the second end of the electrical harness, the inner tubing encasing the electrical cable, a braid tubing extending from the first end of the electrical harness to the second end of the electrical harness, the braid tubing encasing the inner tubing, and an outer tubing extending from the first end of the electrical harness to the second end of the electrical harness, the outer tubing encasing the braid tubing, wherein the braid tubing is physically contacting the inner tubing and the outer tubing, and the braid tubing is configured to prevent out of plane movement of the electrical cable in response to the second component moving with respect to the first component.

In various embodiments, the braid tubing comprises a plurality of wires tightly braided together to form a generally cylindrical tubing.

In various embodiments, the braid tubing is mechanically locked with the inner tubing and the outer tubing.

In various embodiments, the inner tubing encases a plurality of electrical wires.

In various embodiments, the inner tubing comprises a polymer material, and the outer tubing comprises the polymer material.

In various embodiments, the power drive unit further comprises a first electrical plug positioned at the first end of the electrical harness and a second electrical plug positioned at the second end of the electrical harness, the first electrical plug is disposed about the outer tubing.

In various embodiments, the first electrical plug is cured to the outer tubing.

In various embodiments, an outer diameter of the braid tubing is substantially equal to an inner diameter of the outer tubing, and an inner diameter of the braid tubing is substantially equal to an outer diameter of the inner tubing.

An electrical harness system is disclosed, comprising a first member, a second member, the second member moveable with respect to the first member, and an electrical harness, comprising an electrical cable extending from the first member to the second member, an inner tubing extending from a first end of the electrical harness to a second end of the electrical harness, the inner tubing encasing the electrical cable, a braid tubing extending from the first end of the electrical harness to the second end of the electrical harness, the braid tubing encasing the inner tubing, and an outer tubing extending from the first end of the electrical harness to the second end of the electrical harness, the outer tubing encasing the braid tubing, wherein the braid tubing is physically contacting the inner tubing and the outer tubing.

In various embodiments, the braid tubing resists twisting in response to the first member moving with respect to the second member.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
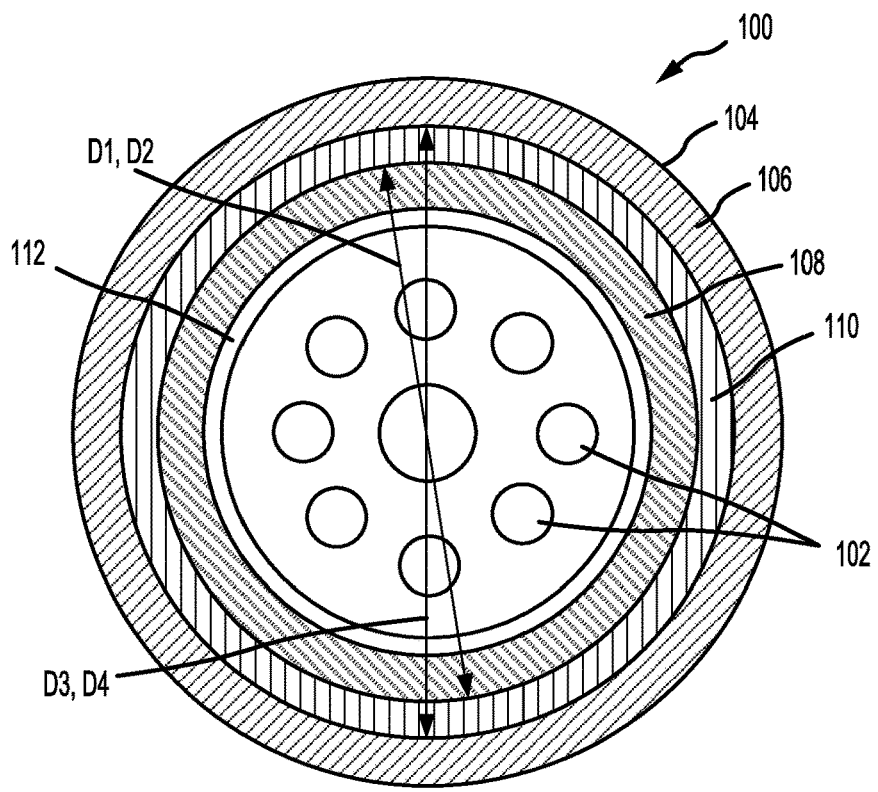
FIG. 1 is a cross-section view of an electrical harness, in accordance with various embodiments.
Figure 2:
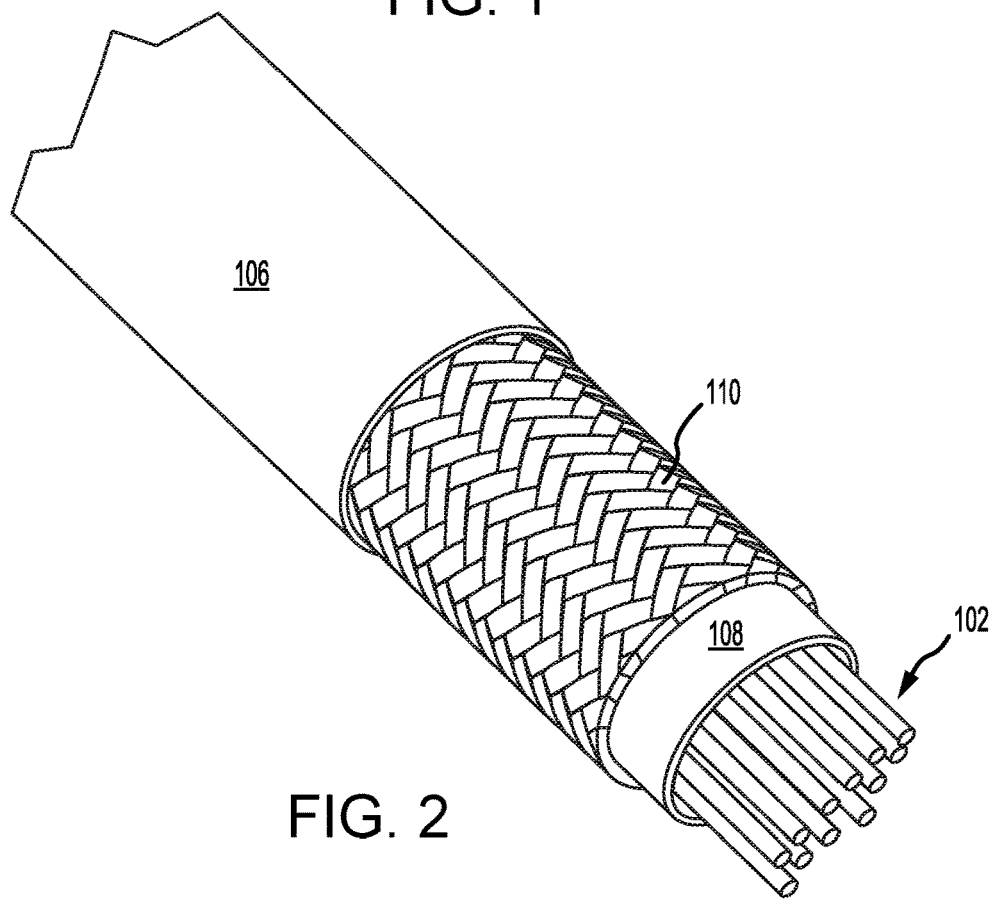
FIG. 2 is a partial cutaway view of an electrical harness, in accordance with various embodiments.

With reference to FIG. 1, a cross-section view of an electrical harness 100 is illustrated, in accordance with various embodiments. Electrical harness 100 may include an electrical cable 112 comprising a plurality of wires 102 disposed within a twist resistant electrical harness 104 comprising an outer tubing 106, an inner tubing 108, and a braid tubing 110 disposed between the inner tubing 108 and the outer tubing 106. In various embodiments, the outer tubing 106 and the inner tubing 108 are made from a polymer material, including thermosetting and/or thermoplastic polymers, such as a polyurethane, among others. In various embodiments, the braid tubing 110 comprises a wire braided tube or sleeve made from a metallic material, such as stainless steel, among others. In various embodiments, the braid tubing 110 comprises a wire braided tube or sleeve made from metal-coated fibers. In various embodiments, the braid tubing 110 comprises a braided tube or sleeve made from a non-metallic material. With momentary reference to FIG. 2, the braid tubing 110 includes wires tightly braided together to form a generally cylindrical tubing. Furthermore, inner tubing 108 and the outer tubing 106 generally conform to the cylindrical shape of braid tubing 110. With respect to FIG. 2, elements with like element numbering, as depicted in FIG. 1, are intended to be the same and will not necessarily be repeated for the sake of clarity.

In various embodiments, and with reference to FIG. 1, inner tubing 108 may be disposed about electrical cable 112. Inner tubing 108 may encase electrical cable 112. In various embodiments, inner tubing 108 encases plurality of wires 102 of the electrical cable 112. Inner tubing 108 may be formed over the plurality of wires 102 via a polymer extrusion manufacturing process in which a polymer is melted and formed in a continuous profile along the length of electrical harness 100. Braid tubing 110 may be disposed about inner tubing 108. Braid tubing 110 may encase inner tubing 108. The inner diameter D1 of braid tubing 110 may be substantially equal to the outer diameter D2 of inner tubing 108. In this regard, the inner diameter surface of braid tubing 110 may be in contact with the outer diameter surface of inner tubing 108. Outer tubing 106 may be disposed about braid tubing 110. Outer tubing 106 may encase braid tubing 110. Outer tubing 106 may be formed over braid tubing 110 via a polymer extrusion manufacturing process in which a polymer is melted and formed in a continuous profile along the length of electrical harness 100. The outer diameter D3 of braid tubing 110 may be substantially equal to the inner diameter D4 of outer tubing 106. In this regard, the outer diameter surface of braid tubing 110 may be in contact with the inner diameter surface of outer tubing 106.

In various embodiments, braid tubing 110 is compressed between outer tubing 106 and inner tubing 108. Due to the relatively soft, elastic nature of the outer tubing 106 and inner tubing 108, the braid tubing 110 may embed into the outer tubing 106 and inner tubing 108, thereby mechanically locking with the outer tubing 106 and inner tubing 108 which prevents the braid tubing 110 from slipping against the outer tubing 106 and inner tubing 108. Thus, the braid tubing 110 is in physical contact with the outer tubing 106 and inner tubing 108. In this manner, the outer tubing 106 and inner tubing 108 compresses the braid tubing 110 such that the braid tubing 110 maintains a common diameter along the length of electrical harness 100, which minimizes twisting of electrical harness 100. Stated differently, the braid tubing 110 is prevented from twisting, due to the braided wires being mechanically locked with the outer tubing 106 and inner tubing 108, while allowing in-plane bending of electrical harness 100, such as during relative movement of two members to which opposite ends of electrical harness 100 is connected. In this regard, an electrical harness system may include a first member (e.g., a first component 336 described in FIG. 3), a second member (e.g., a second component 338 described in FIG. 3) moveable with respect to the first member, and the electrical harness 100 extending therebetween.

Inner tubing 108, may extend from a first end (e.g., first end 301 of FIG. 3) of the electrical harness 100 to a second end (e.g., second end 302 of FIG. 3) of the electrical harness 100. Braid tubing 110 may extend from a first end (e.g., first end 301 of FIG. 3) of the electrical harness 100 to a second end (e.g., second end 302 of FIG. 3) of the electrical harness 100. Outer tubing 106 may extend from a first end (e.g., first end 301 of FIG. 3) of the electrical harness 100 to a second end (e.g., second end 302 of FIG. 3) of the electrical harness 100.

One such application of an electrical harness may be for a system with a first component that moves relative to a second component, with a first end of the electrical harness coupled to the first component and a second, opposite end of the electrical harness coupled to the second component, where it is desired to control the planes of movement of the dynamic electrical harness.

Figure 3:
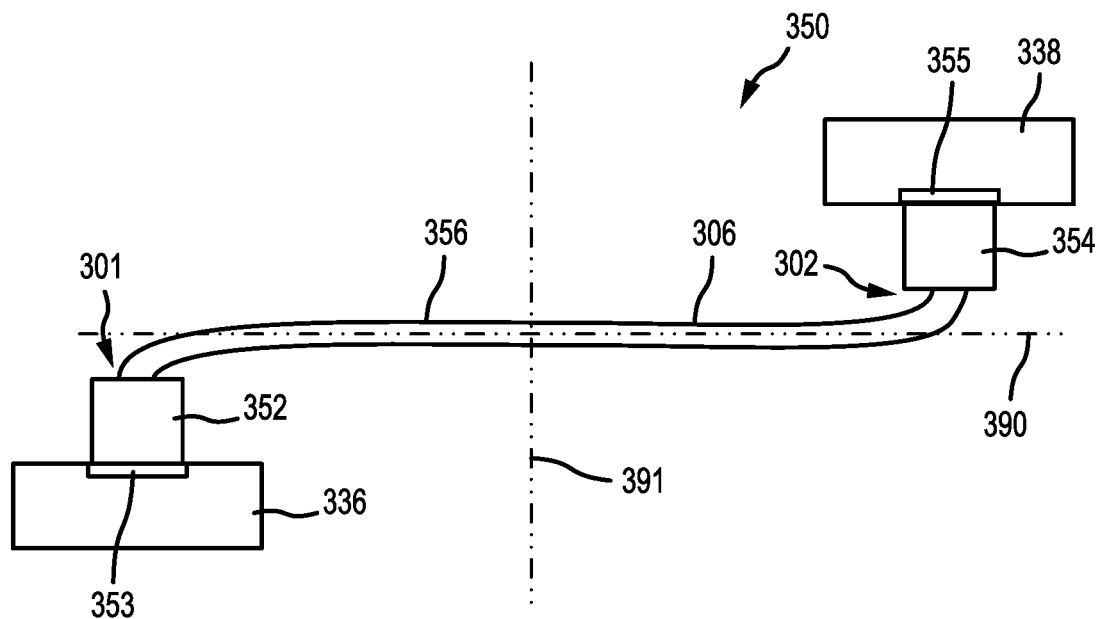
FIG. 3 is a schematic perspective view of a harness system having an electrical harness, in accordance with various embodiments.

Referring now to FIG. 3, a harness system 350 is illustrated within the first component 336. In various embodiments, the harness system 350 includes a first electrical plug 352, configured to attach to the first component 336 via a first electrical receptacle 353. The first electrical plug 352 may receive various power inputs from a power supply and control module that are configured to power an electronic component. In various embodiments, the harness system 350 also includes a second electrical plug 354, configured to attach to a second component 338, via a second electrical receptacle 355. The second electrical plug 354 may receive the power inputs from the first electrical plug 352 and conveys them to one or more electronics associated with second component 338. An electrical harness 356 connects the first electrical plug 352 to the second electrical plug 354. Electrical harness 356 may be similar to electrical harness 100 of FIG. 1 and FIG. 2. First electrical plug 352 may be coupled to a first end 301 of the electrical harness 356. Second electrical plug 354 may be coupled to a second end 302 of the electrical harness 356.

In various embodiments, first electrical plug 352 is coupled to an outer tubing 306 of electrical harness 356. Outer tubing 306 may be similar to outer tubing 106 of FIG. 1 and FIG. 2. In various embodiments, second electrical plug 354 is coupled to the outer tubing 306 of electrical harness 356. First electrical plug 352 and second electrical plug 354 may be coupled to outer tubing 306 using an overmolding manufacturing process wherein a melted polymer is injected in a mold tool surrounding a portion of the outer tubing 306 and cured to the outer tubing 306. In this regard, loads may be transferred between first electrical plug 352 and second electrical plug 354, via braid tubing 110 (see FIG. 1) and outer tubing 306. Furthermore, the orientation of first electrical plug 352 relative to second electrical plug 354 may be maintained via the braid tubing 110 (see FIG. 1) of electrical harness 356. Stated differently, braid tubing 110 (see FIG. 1) may react to torque applied to electrical harness 356, preventing twisting of electrical harness 356. For example, electrical harness 356 may bend about an axis 391 as second component 338 moves with respect to first component 336 without bending, deflecting, or otherwise moving in a direction parallel to axis 391. Stated differently, as second component 338 moves with respect to first component 336 (e.g., second component 338 may rotate about axis 391), electrical harness 356 may be restricted to movement primarily within a single plane, such as plane 390. Furthermore, electrical harness 356 may be manufactured with first electrical plug 352 and second electrical plug 354 preformed to a desired orientation with respect to each other to prevent a technician from misaligning or incorrectly installing the electrical harness 356 due to the braid tubing 110 (see FIG. 1) being resistant to twisting of electrical harness 356.

Figure 4A:
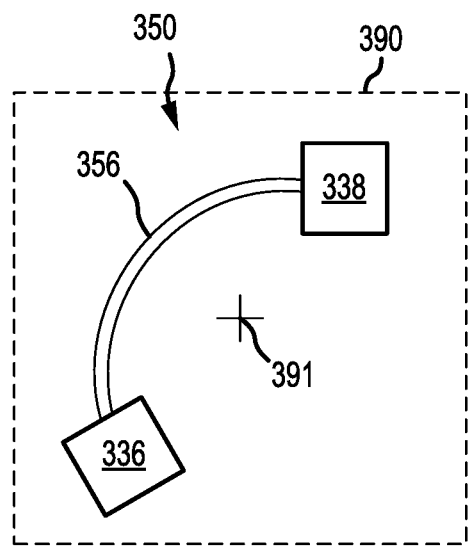
FIGS. 4A and 4B are schematic overhead views of a harness system, showing an electrical harness in different orientations, in accordance with various embodiments.
Figure 4B:
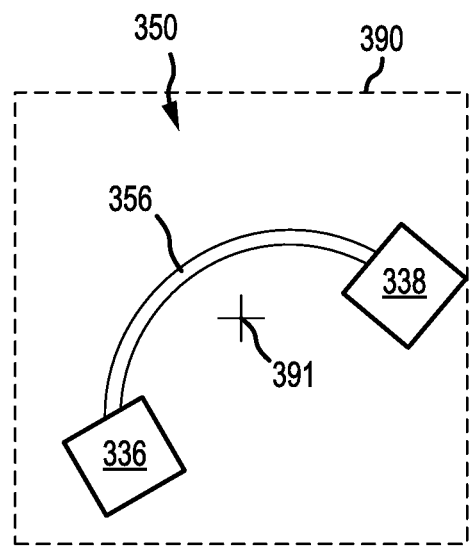

With combined reference to FIG. 4A and FIG. 4B, a top view of harness system 350 is illustrated. As second component 338 moves, the harness system 350 will remain primarily in the same plane, e.g., plane 390 if second component 338 is rotating about axis 391. For example, FIG. 4A illustrates second component 338 at a first position with respect to first component 336 and FIG. 4B illustrates second component 338 rotated about axis 391 to a second position with respect to first component 336. Electrical harness 356 may be restricted to movement within plane 390 as second component 338 moves between the first position and the second position. That is, the braid tubing 110 (see FIG. 1) is configured to prevent out-of-plane bending (i.e., movement perpendicular to plane 391) of the electrical harness 356 in response to the second component 338 moving with respect to the first component 354. Any power cables being carried within the harness system 350 are constrained from being caught within moving or rotating components of the system and from inadvertent grounding against conductive components of the system.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching. Further, throughout the present disclosure, like reference numbers denote like elements. Accordingly, elements with element numbering may be shown in the figures, but may not necessarily be repeated herein for the sake of clarity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electrical harness, comprising: an electrical cable; an inner tubing extending from a first end of the electrical harness to a second end of the electrical harness, the inner tubing encasing the electrical cable; a braid tubing extending from the first end of the electrical harness to the second end of the electrical harness, the braid tubing encasing the inner tubing; and an outer tubing extending from the first end of the electrical harness to the second end of the electrical harness, the outer tubing encasing the braid tubing; wherein the braid tubing physically contacts the inner tubing and the outer tubing; and wherein the braid tubing is mechanically locked with the inner tubing and the outer tubing.

2. The electrical harness of claim 1, wherein the braid tubing comprises a plurality of wires tightly braided together to form a generally cylindrical tubing.

3. The electrical harness of claim 1, wherein the inner tubing encases a plurality of electrical wires.

4. The electrical harness of claim 1, wherein the inner tubing comprises a polymer material.

5. The electrical harness of claim 1, wherein the outer tubing comprises a polymer material.

6. The electrical harness of claim 1, further comprising a first electrical plug positioned at the first end of the electrical harness and a second electrical plug positioned at the second end of the electrical harness.

7. The electrical harness of claim 6, wherein the first electrical plug is disposed about the outer tubing.

8. The electrical harness of claim 1, wherein an outer diameter of the braid tubing is substantially equal to an inner diameter of the outer tubing.

9. The electrical harness of claim 1, wherein an inner diameter of the braid tubing is substantially equal to an outer diameter of the inner tubing.

10. A harness system, comprising: a first component; a second component configured to move with respect to the first component; and an electrical harness, comprising: an electrical cable having a first end and a second end; an inner tubing extending from the first end of the electrical harness to the second end of the electrical harness, the inner tubing encasing the electrical cable; a braid tubing extending from the first end of the electrical harness to the second end of the electrical harness, the braid tubing encasing the inner tubing; and an outer tubing extending from the first end of the electrical harness to the second end of the electrical harness, the outer tubing encasing the braid tubing; wherein the braid tubing is physically contacting the inner tubing and the outer tubing, and the braid tubing is configured to prevent out of plane movement of the electrical cable in response to the second component moving with respect to the first component, wherein the braid tubing is mechanically locked with the inner tubing and the outer tubing.

11. The harness system of claim 10, wherein the braid tubing comprises a plurality of wires tightly braided together to form a generally cylindrical tubing.

12. The harness system of claim 10, wherein the inner tubing encases a plurality of electrical wires.

13. The harness system of claim 10, wherein the inner tubing comprises a polymer material, and the outer tubing comprises the polymer material.

14. The harness system of claim 10, further comprising a first electrical plug positioned at the first end of the electrical harness and a second electrical plug positioned at the second end of the electrical harness, the first electrical plug is disposed about the outer tubing.

15. The harness system of claim 14, wherein the first electrical plug is cured to the outer tubing.

16. The harness system of claim 10, wherein an outer diameter of the braid tubing is substantially equal to an inner diameter of the outer tubing, and an inner diameter of the braid tubing is substantially equal to an outer diameter of the inner tubing.

17. An electrical harness system, comprising: a first member; a second member, the second member moveable with respect to the first member; and an electrical harness, comprising: an electrical cable extending from the first member to the second member; an inner tubing extending from a first end of the electrical harness to a second end of the electrical harness, the inner tubing encasing the electrical cable; a braid tubing extending from the first end of the electrical harness to the second end of the electrical harness, the braid tubing encasing the inner tubing; and an outer tubing extending from the first end of the electrical harness to the second end of the electrical harness, the outer tubing encasing the braid tubing; wherein the braid tubing is physically contacting the inner tubing and the outer tubing; and wherein the braid tubing is mechanically locked with the inner tubing and the outer tubing.

18. The electrical harness system of claim 17, wherein the braid tubing resists twisting in response to the first member moving with respect to the second member.

* * * * *